United States Patent Office 3,530,205
Patented Sept. 22, 1970

3,530,205
PHOSPHORUS-CONTAINING POLYOLS
John T. Patton, Jr., Wyandotte, and Robert J. Hartman and Arthur L. Austin, Southgate, Mich., assignors to Wyandotte Chemical Corporation, Wyandotte, Mich., a corporation of Michigan
No Drawing. Filed June 9, 1966, Ser. No. 556,266
Int. Cl. C07f 9/08; C09k 3/00; C08g 17/133
U.S. Cl. 260—953                             3 Claims

ABSTRACT OF THE DISCLOSURE

Phosphorus-containing products are prepared by transesterifying neutral phosphate polyols with polyhydric alcohols or ethylene oxide adducts of polypropylene glycol. The resulting products exhibit surface active properties

---

The present invention relates to novel phosphorus-containing products and to a process for the preparation thereof. More particularly, the invention relates to phosphorus-containing products obtained by transesterifying, with organic compounds containing at least two hydroxyl groups, essentially neutral phosphate polyols prepared by the reaction of a phosphoric acid with an alkylene oxide.

Phosphate polyols prepared by the reaction of alkylene oxides with phosphoric acid are well known in the art. These polyols, as a result of their reactive hydrogen atoms, have found utility in a number of applications including flame-retardant polymers, particularly rigid polyurethane foams. To improve the properties of these polyols, various modifications have been proposed. In one modification, an alkylene oxide is initially reacted with a long-chain organic compound having an active hydrogen atom and the resulting compound is further reacted with an acid of phosphorus to obtain a phosphorus-containing compound having long chains. The reactions mentioned above are very complex and must be carefully controlled. Furthermore, because of the difficulties associated with these reactions, only a select number of reactants may be successfully employed if the above course of reaction is followed.

In accordance with the present invention, it has been determined that new phosphorus-containing products may be prepared by transesterifying, with an organic compound containing at least two hydroxyl groups, an essentially neutral phosphate polyol prepared by the reaction of a phosphoric acid having a $P_2O_5$ equivalency of from about 72% to about 95% with an alkylene oxide. It is surprising and unexpected that the transesterification so readily occurs in accordance with this invention since heretofore the transesterification of phosphate polyols was considered to proceed so slowly that "a number of organic chemists have said that the reaction does not occur." John R. Van Wazer, Phosphorus And Its Compounds, vol. 1, page 585. The new polymers of this invention range from pourable liquids to high-viscosity rubber-like products, thus affording application in polyurethane foams and in polyester resins, as plasticizer in vinyl resins, as additives for functional fluids, and as surface active agents. To illustrate, the products prepared by transesterifying a neutral phosphate polyol with polyhydric alcohols or alkylene oxide adducts thereof, as a result of their increased hydroxyl content, demonstrate excellent utility in the preperation of flame-retardant, rigid polyurethane foams. Products prepared from aromatic-containing transesterifying agents demonstrate marked improvements in the structural properties of polyurethane foams prepared therefrom. Products prepared from those alkylene oxide adducts which are surface active demonstrate excellent utility in a number of detergent applications.

The essentially neutral phosphate polyols which are transesterified into the phosphorus-containing products of the present invention may be prepared in several ways. Preferably, however, they are prepared by the direct reaction of an alkylene oxide with a phosphoric acid. They may also be prepared by oxidation of the corresponding phosphite polyol by the method disclosed in U.S. Pat. No. 3,081,331.

The exact structure obtained when the essentially neutral reaction products are transesterified in accordance with the present invention is unknown. Unquestionably, a mixture of compounds having different chemical structures is obtained. Some of the compounds contain recurring oxyphosphorus units while others contain long-chain oxyalkylene units, while still others contain a combination of phosphorus and similar and/or dissimilar unsymmetrical and/or symmetrical oxyalkylene units. In view of this uncertainty, applicants do not wish to be bound by any exact chemical structure and will refer to their new polymers as the products from the transesterification of essentially neutral reaction products of alkylene oxides and acids of phosphorus.

The amounts of alkylene oxide and acid of phosphorus which are necessary to prepare the essentially neutral phosphate polyols which are transesterified into the new polymers of this invention will vary, depending upon the alkylene oxide used and the $P_2O_5$ equivalency of the acid selected. For example, if propylene oxide and 100% phosphoric acid are the selected reactants, about six moles of propylene oxide per mole of acid is required to prepare the essentially neutral phosphate polyols. With higher molecular weight alkylene oxides and 100% phosphoric acid, less than six moles of the oxide per mole of the acid will give the desired phosphate polyols.

Acids of phosphorus which may be used in the preparation of the phosphate polyols which are transesterified according to this invention are those acids corresponding to a $P_2O_5$ equivalency of from about 72% to about 95%. Representative acids include the 100% to 131% phosphoric acids such as orthophosphoric acid, pyrophosphoric acid, polyphosphoric acid and certain metaphosphoric acids. Certain partial esters of any of these acids, and mixtures of any of the above acids and/or esters, may also be employed.

Alkylene oxides which may be used in the preparation of the phosphate polyols which are transesterified according to this invention include ethylene oxide, propylene oxide, the isomeric normal butylene oxides, hexylene oxide, octylene oxide, dodecene oxide, methoxy and other alkoxy propylene oxides, styrene oxide and cyclohexene oxide. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

The organic compounds which are employed in accordance with the present invention are those compounds containing at least two hydroxyl groups. Representative compounds include polyhydric alcohols, polysaccharides and derivatives thereof, and alkylene oxide adducts of compounds containing at least two active hydrogen atoms. Mixtures of any of the above may also be used. Polyhydric alcohols and the alkylene oxide adducts mentioned above are the preferred compounds.

Polyhydric alcohols which may be employed in accordance with the present invention include ethylene glycol, propylene glycol, glycerine, trimethylolpropane, hexanetriol, pentaerythritol, sucrose, sorbitol, mannitol and bisphenol A. Also included in the term "polyhydric alcohols" as employed in the present invention are those triglycerides such as castor oil which, because of their reactive hydroxyl groups, behave as do the standard polyhydric alcohols.

Polysaccharides and derivatives thereof which may be employed in accordance with the present invention include alpha-methylglucoside, maltose, cellulose, cellulose ethers, starch, starch ethers, amylose, amylopectin and dextrose.

Alkylene oxide adducts of compounds containing at least two active hydrogen atoms which may be employed in accordance with the present invention include the alkylene oxide adducts of any of the polyhydric alcohols and polysaccharides mentioned above, as well as adducts of any other compound having at least two active hydrogen atoms as determined by the Zerewitinoff test described by Kohler in J. Am. Chem. Soc., 49, 3182 (1927). The active hydrogen atoms are usually attached to oxygen, nitrogen, or sulfur atoms. Thus, suitable active hydrogen-containing groups include —OH, —NH—, —COOH and —SH. Compounds which contain two or more different groups within the above-defined classes may also be used such as amino alcohols.

In addition to the polyhydric alcohols, oils and polysaccharides mentioned above, other compounds having at least two active hydrogen atoms which may be adducted with alkylene oxide include mercaptans such as 1,2-ethane dithiol, 1,2-propane dithiol, 1,6-hexane dithiol, and 1,2,3-propane trithiol; acids such as oxalic acid, succinic acid, adipic acid, suberic acid, maleic acid, fumaric acid, isophhtalic acid, terephthalic acid, acoustic acid, and trimillitic acid; hydroxyl-containing polyesters such as those prepared from any of the above acids and dihydric alcohols such as ethylene glycol and propylene glycol; amines such as aniline, ortho- and para-phenylene diamine, the isomeric tolylene diamines, diethanolamine, ethylamine, ethylene diamine, propylene diamine, diethylene triamine, and triisopropanolamine; amides such as n-octyl amide, n-dodecyl amide, n-oleic amide, and $\alpha,\omega$-dodecandioic amide; sulfonamides such as benzene disulfonamide and n-octylsulfonamide; and thioamides such as benzene disulfonthioamide. Alkylene oxides which may be employed in the preparation of these adducts include those mentioned above in the preparation of the essentially neutral phosphate polyols. Preferred alkylene oxide adducts which are employed in accordance with the present invention include the propylene oxide adducts of polyhydric alcohols or polyalkylene polyamines as well as the adducts prepared from the reaction of mixtures of propylene oxide and ethylene oxide with polyhydric alcohols or polyalkylene polyamines. Adducts prepared from mixtures of alkylene oxides may either have a block or heteric structure. Both of these types of adducts are operable in the present invention.

The products of the present invention are prepared by adding an essentially neutral reaction product of a phosphoric acid and an alkylene oxide to an organic compound having at least two active hydroxyl groups and heating the reaction mixture at temperatures of from about 50° C. to 200° C., preferably 80° C. to 150° C., at reduced pressures. Pressures of from less than one millimeter of mercury up to 100 millimeters of mercury are preferred. If desired, a catalyst may be employed. Typical catalysts include metallic sodium, organic amines and inorganic bases. The time required for the transesterification reaction may vary from about two to about 100 hours, depending upon the particular reactants, the catalyst employed, if any, and the temperature and pressure of the reaction. An inert diluent may also be employed if desired. In those instances where a polysaccharide is employed as the transesterifying agent, it is often advantageous to employ such a diluent. Typical diluents include aromatic hydrocarbons such as benzene and toluene, chlorinated hydrocarbons such as carbon tetrachloride, perchloroethylene and chlorobenzenes, and ketones such as acetone and methylethylketone.

The following examples serve to illustrate the invention. All parts are by weight unless otherwise specified.

EXAMPLES I–IV

In the following examples, various organic compounds having at least two hydroxyl groups were employed in the transesterification of an essentially neutral reaction product of six moles of propylene oxide and one mole of orthophosphoric acid ($P_2O_5$ equivalency of 72%). The transesterification occurred in the following manner.

The organic compound was charged to a reaction vessel equipped with a nitrogen source, thermometer, stirrer and heat exchange means. The compound was heated at 100° C., at about one to five millimeters of mercury, under nitrogen for about two hours. After cooling to room temperature, the orthophosphoric acid-propylene oxide reaction product described above was added to the vessel and the reaction mixture was heated at from about 80° C. to 150° C. for from four to twelve hours at from one to ten millimeters of mercury. During the course of the reaction, a homogeneous phase developed and volatile liquids were distilled from the reaction mixture. The reaction product was then removed from the vessel and analyzed. The specific reactants and amounts thereof, as well as product characterizations, are presented in Table 1.

TABLE 1

| | Reactants | | Product Characterizations | |
|---|---|---|---|---|
| | Propylene oxide phosphoric acid adduct, parts | Organic compound | Parts | Hydroxyl number | Percent phosphorus |
| Example: | | | | | |
| I | 356 | Glycerine | 73.6 | 509.3 | 6.7 |
| II | 311.5 | Pentaerythritol | 47.6 | 80.5 | 8.2 |
| III | 445 | Sorbitol | 91 | 399.8 | 7.4 |
| IV | 115 | Mannitol | 45 | 449.3 | 7.16 |
| V | 222 | Bisphenol A | 56 | 165 | 6.4 |
| VI | 90 | A | 300 | 93 | 1.7 |
| VII | 90 | B | 200 | 54.3 | 3.66 |
| VIII | 36 | C | 300 | 75 | 0.8 |
| IX | 134 | D | 145 | 99.4 | 3.8 |
| X | 45 | E | 300 | 51 | 1.0 |
| XI | 130 | F | 165 | 349.6 | 4.3 |
| XII | 89.2 | G | 88 | 306.5 | 4.1 |

Footnotes at end of table.

TABLE 1—Continued

| | Reactants | | Product Characterizations | |
|---|---|---|---|---|
| | Propylene oxide phosphoric acid adduct, parts | Organic compound Parts | Hydroxyl number | Percent phosphorus |
| Example: | | | | |
| XIII | 112 | Castor oil 49 | 129.0 | 3.5 |
| XIV | 22.3 | N,N,N',N'- 146 tetrakis-(2-hydroxypropyl)-ethylene diamine. | 252.2 | 4.9 |
| XV | 212 | Bisphenol A 144 | | |
| | | H 425 | 481 | 2.15 |

A=2,900 molecular weight adduct of ethylene oxide and polypropyleneglycol, approximately 40% of the total weight being oxyethylene groups.
B=2,500 molecular weight adduct of ethylene oxide and polypropylene glycol, approximately 20% of the total weight being oxyethyelene groups.
C=8,700 molecular weight adduct of ethylene oxide and polypropylene glycol, approximately 80% of the total weight being oxyethylene groups.
D=640 molecular weight adduct of ethylene oxide and nonyl phenol.
E=3,000 molecular weight adduct of propylene oxide and glycerine.
F=514 molecular weight adduct of propylene oxide and sorbitol.
G=418 molecular weight adduct of propylene oxide and trimethylolpropane.
H=850 molecular weight adduct of propylene oxide and sucrose.

EXAMPLE XVI

Various rigid polyurethane foams were prepared by mixing, in each instance, about 23 parts of the product of Examples I, II, III, V and X–XV along with:

| | Parts |
|---|---|
| Tolylene diisocyanate | 17.4 |
| Silicone surfactant | 0.2 |
| Halogenated hydrocarbon blowing agent | 5.0 |
| Trimethylpiperazine | 0.8 |
| Stannous octoate | 0.6 |

The resulting foams did not shrink, were resistant to humidity, and possessed excellent flame-retardant properties.

EXAMPLE XVII

The reaction products of Examples VI–IX were evaluated as surface active agents in accordance with the Carbon Soil Removal Test as described in U.S. Pat No. 2,677,700, columns 14–16, and Tagged Clay Soil Removal Test as described in Journal American Oil Chemists' Society, 42, pp. 993–97 (1965). The results of this evaluation appear in Table 2.

TABLE 2

| | Carbon soil removal | | Tagged clay soil | |
|---|---|---|---|---|
| | CSR | WR | SR | WR |
| Product of Example: | | | | |
| VI | 237 | 237 | 116 | 56 |
| VII | 215 | 259 | 120 | 41 |
| VIII | 139 | 226 | 91 | 53 |
| IX | 209 | 268 | 123 | 50 |

EXAMPLE XVIII

Following the procedure of Example I, 120 parts of an essentially neutral reaction product of 115% phosphoric acid ($P_2O_5$ equivalency of 82.3%) and propylene oxide was transesterified with 86 parts of a polyol prepared from two moles of propylene oxide and one mole of bisphenol A and 257 parts of a polyol prepared from one mole of sucrose and two moles of propylene oxide. An amber-colored liquid product (431.6 parts) was obtained having a refractive index of $n_D^{27}$ 1.4924, a hydroxyl number of 370, an acid number of 1.97 and 6.3% phosphorus. A polyurethane foam prepared from this product exhibited excellent structural and flame-retardant properties.

EXAMPLE XIX

Following the procedure of Example I, 120 parts of an essentially neutral reaction product of 115% phosphoric acid and propylene oxide was transesterified with 86 parts of a polyol prepared from two moles of propylene oxide and one mole of bisphenol A, and 257 parts of a polyol prepared from one mole of pentaerythritol and two moles of propylene oxide. A yellow liquid product (409.6 parts) was obtained having a refractive index of $n_D^{26}$ 1.4860, a hydroxyl number of 410, an acid number of 3.66 and 6.4% phosphorus.

EXAMPLE XX

Following the procedure of Example I, 120 parts of an essentially neutral reaction product of 115% phosphoric acid and propylene oxide was transesterified with 86 parts of a polyol prepared from two moles of propylene oxide and one mole of bisphenol A and 257 parts of a polyol prepared from α-methyl glucoside and propylene oxide. An amber liquid product (409.6 parts) was obtained having a refractive index of $n_D^{26}$ 1.4886, a hydroxyl number of 339, an acid number of 0.35 and 6.4% phosphorus.

What is claimed is:

1. Phosphorus-containing products prepared by transesterifying, at temperatures between 50 C. and 200° C. under reduced pressure, an essentially neutral phosphate polyol prepared by the reaction of an alkylene oxide with a phosphoric acid having a $P_2O_5$ equivalency of from 72% to 95% with a polyhydric alcohol selected from the group consisting of ethylene glycol, propylene glycol, glycerine, trimethylolpropane, hexanetriol, pentaerythritol, sucrose, sorbitol, mannitol and bisphenol A.

2. The products of claim 1 when the alkylene oxide is propylene oxide.

3. The products of claim 1 when the phosphoric acid is 100% phosphoric acid.

References Cited

UNITED STATES PATENTS 3,324,202  6/1967  Franko-Filipasie _____ 260—920

CHARLES B. PARKER, Primary Examiner

A. H. SUTTO, Assistant Examiner

U.S. Cl. X.R.

252—78, 89; 260—2.5, 30.6, 75, 209, 209.5, 210, 231, 920, 953, 978, 980, 982